United States Patent
Wood et al.

(10) Patent No.: US 7,308,532 B1
(45) Date of Patent: Dec. 11, 2007

(54) METHOD FOR DYNAMICALLY IMPLEMENTING N+K REDUNDANCY IN A STORAGE SUBSYSTEM

(75) Inventors: Robert B. Wood, Niwot, CO (US); Nisha D. Talagala, Livermore, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 382 days.

(21) Appl. No.: 10/987,625

(22) Filed: Nov. 12, 2004

(51) Int. Cl.
*G06F 12/00* (2006.01)
*G06F 13/00* (2006.01)
*G06F 13/28* (2006.01)
*G06F 11/00* (2006.01)

(52) U.S. Cl. .................. 711/112; 711/114; 711/170; 714/5

(58) Field of Classification Search .............. None
See application file for complete search history.

(56) References Cited

U.S. PATENT DOCUMENTS

| | | | |
|---|---|---|---|
| 5,485,474 A | | 1/1996 | Rabin |
| 5,574,851 A | * | 11/1996 | Rathunde .................. 714/7 |
| 5,809,224 A | * | 9/1998 | Schultz et al. ............. 714/7 |
| 5,822,782 A | * | 10/1998 | Humlicek et al. ......... 711/170 |
| 6,304,942 B1 | * | 10/2001 | DeKoning ................ 711/114 |
| 6,880,102 B1 | * | 4/2005 | Bridge .................... 714/6 |
| 2004/0078642 A1 | * | 4/2004 | Nanda .................... 714/6 |

OTHER PUBLICATIONS

Anonymous; "Compaq RAID Advanced Data Guarding: A Cost-effective, Fault-tolerant Solution"; COMPAQ Computer Corp., Houston, TX,; Jun. 2002.
Blomer, J., et al; "An XOR-Based Erasure-Resilient Coding Scheme"; International Computer Science Institute, Berkeley, CA; Aug. 1995.
Gibson, Garth A., et al; "Coding Techniques for Handling Failures in Large Disk Arrays"; Computer Science Division Electrical Engineering and Computer Sciences, University of California at Berkeley, Mar. 1989.

* cited by examiner

*Primary Examiner*—Sanjiv Shah
*Assistant Examiner*—Marwan Ayash
(74) *Attorney, Agent, or Firm*—Meyertons Hood Kivlin Kowert & Goetzel, P.C.; Stephen J. Curran (57) ABSTRACT

In one embodiment, a storage subsystem includes a plurality of storage arrays each including a plurality of storage devices. The storage subsystem also includes a plurality of array controllers each coupled to one or more of the plurality of storage arrays. One or more of the arrays corresponds to a failure group. Each array controller may create a storage volume including storage devices belonging to one or more of plurality of storage arrays. In addition, the storage subsystem includes a redundancy controller that may be configured to implement N+K redundancy. The redundancy controller includes configuration functionality that may determine a number of redundant system data blocks to be stored on different storage devices for a given stripe of data that is dependent upon particular values of N and K and upon physical system configuration information.

19 Claims, 8 Drawing Sheets

METHOD FOR DYNAMICALLY IMPLEMENTING N+K REDUNDANCY IN A STORAGE SUBSYSTEM

BACKGROUND OF THE INVENTION

1. Field of the Invention

This invention relates to storage systems employing redundant arrays of inexpensive disks (RAID) techniques and, more particularly, to the dynamic configuration of RAID sets within the storage systems.

2. Description of the Related Art

Many computer systems employ mass storage systems that may include multiple storage subsystems. These mass storage systems may use arrays of storage devices, such as hard disks, for example. The use of storage arrays grew, in part, from the need to increase storage system performance. In such systems, storage performance may be increased by performing multiple I/O operations in parallel over an array of disks. By reading and writing multiple disks simultaneously, the storage system performance may be greatly improved.

However, using arrays of multiple disks comes with the disadvantage of increasing failure rates. For example, in a small array containing four disks, the mean time between failure (MTBF) for the array will generally be one-fourth that of a single disk. It is not uncommon for storage device arrays to include many more than four disks, shortening the mean time between failure from years to months or even weeks. Modern systems address this reliability issue by employing fault protection, or "redundancy", so that data lost from a device failure may be recovered.

One common approach to providing fault protection in arrays of disks is to use one or more of the array architectures defined in redundancy schemes known as Redundant Arrays of Inexpensive Disks (RAID). A fundamental approach to RAID schemes includes the "striping" or partitioning of each drive in the array into multiple sections which are referred to as stripe units. Depending on the RAID implementation, a stripe may be as small as a single sector or as large as multiple blocks. Common RAID schemes include RAID 0, RAID 1, RAID 2, RAID 3, RAID 4, RAID 5 and RAID 6. In addition there are several variants or hybrid RAID schemes such as RAID 0+1, RAID 10, and RAID 53. Each of the RAID schemes has advantages and disadvantages. Some of the schemes may target increased performance, while others target increased availability.

In a typical data center, a given storage sub-system array or group of arrays may have common components in which a failure of such a component may take down the entire system or sub-system. Such failures are commonly referred to as Single-Points-of-Failure (SPoF). Depending on specific storage implementations, an array or arrays that have common components may define a failure group. More generally, any group of components or storage devices that share a common SpoF may be referred to as a failure group. These SpoF's often exist in storage subsystems, rack-mounted arrays comprising multiple disc drives, control logic, power systems and signal and power distribution schemes. One such SPoF is often a system component referred to as the midplane, which affects the interconnection of signals and power between the various components in a storage sub-system. An SPoF may negate any precautions that system administrators may use such as traditional RAID striping across drives in an array. For example, if a midplane fails, attached hosts are unable to access any drive in an array, regardless of any local striping.

One common technique used to mitigate an array SPoF is vertical striping. One conventional vertical striping technique uses a RAID 5 stripe that is composed of drives that physically reside in distinct arrays, such that two drives in a stripe do not reside in the same array. Since conventional vertical striping using a RAID 5 scheme may only be successful if each drive resides in a distinct array, this scheme is difficult if not impossible to use efficiently in small systems. In addition, conventional vertical striping is sometimes limited in its flexibility.

The RAID 5 scheme is also known more generally as an N+K scheme, where N drives are augmented with a K=1 extra drive to create a single parity group. Such a single parity group is tolerant of single drive failures, but intolerant of multiple drive failures. Several schemes have been proposed that define other RAID protection schemes involving K drives worth of redundant information, where $K \geq 2$ extra drives are used in conjunction with logic and control to statically protect a data store from up to K drive failures.

However, modern storage systems are typically a dynamic environment in which configurations may change rapidly due the dynamic and high-growth nature of application and storage volume administration, changing global sparing schemes, the desire to be able to expand storage in a storage subsystem without complete volume reconfiguration (i.e., online expansion and concatenation while maintaining application availability), the desire to maximize efficient use of storage and minimize storage costs, and so on. Thus, it may be desirable to have flexibility in storage system configuration, where system administrators may wish to dynamically configure a volume with a certain capacity without particular attention to where the physical drives reside in the storage system while still maintaining a given level of protection and/or availability.

SUMMARY

Various embodiments of a method and system for dynamic configuration of a storage subsystem into RAID sets are disclosed. In one embodiment, a storage subsystem includes a plurality of storage arrays each including a plurality of storage devices. The storage subsystem also includes a plurality of array controllers each coupled to one or more of the plurality of storage arrays. One or more of the arrays corresponds to a failure group. Each array controller may create a storage volume including storage devices belonging to one or more of plurality of storage arrays. In addition, the storage subsystem includes a redundancy controller that may be configured to implement N+K redundancy. The redundancy controller includes configuration functionality that may determine a number of redundant system data blocks to be stored on different storage devices for a given stripe of data that is dependent upon particular values of N and K and upon physical system configuration information such as a total number of the plurality of storage devices in each the plurality of storage arrays.

In one specific implementation, the particular values of N and K may be initial values provided as system configuration parameters. In response to detecting a change in the system configuration parameters, the configuration functionality may dynamically reconfigure the storage volume and determine a new number of redundant system data blocks to be stored on different storage devices for a given stripe of data.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Figure 1:
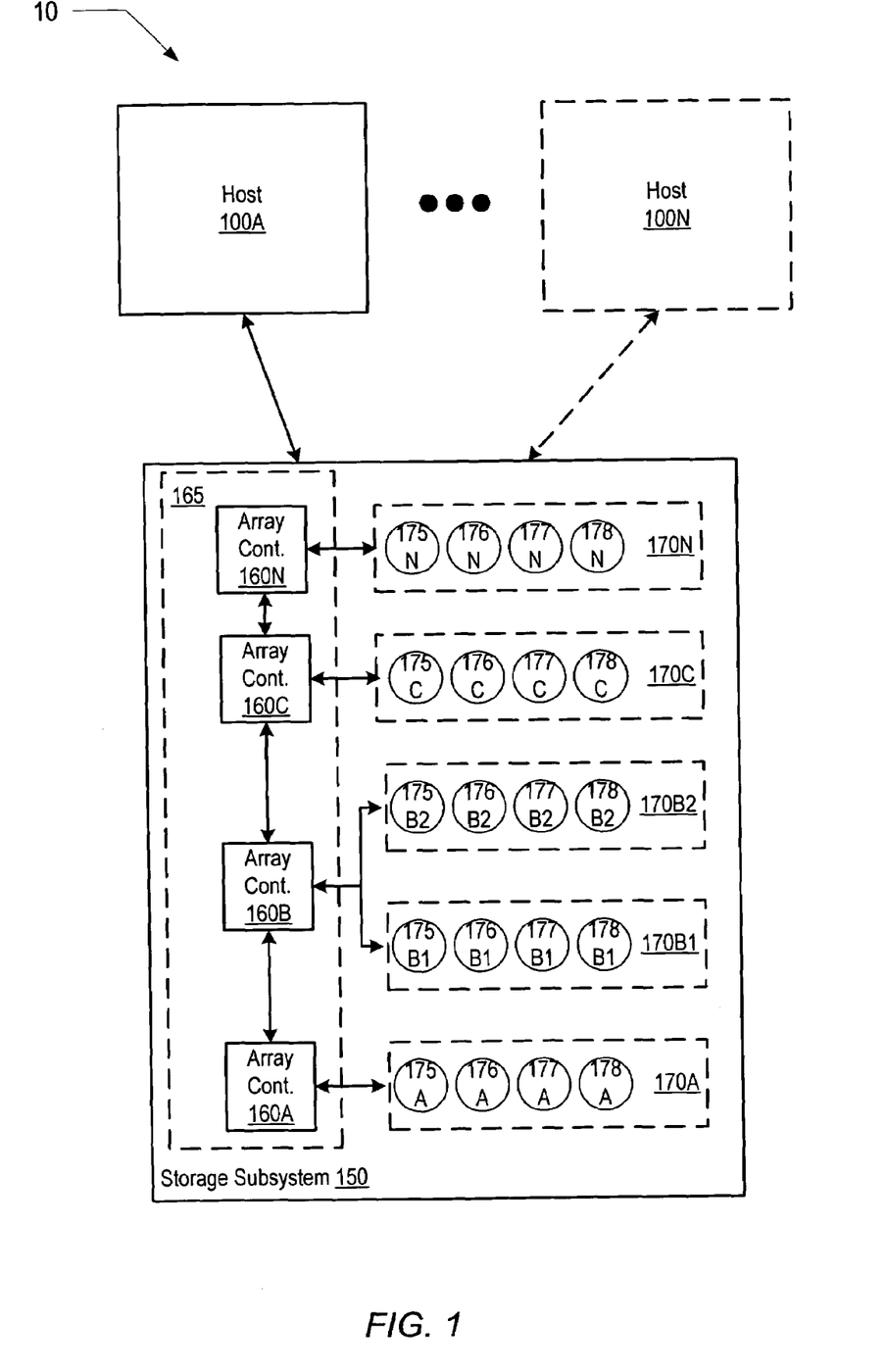
FIG. 1 is a block diagram of one embodiment of a system including a storage subsystem.

Turning now to FIG. 1, a block diagram of one embodiment of a system including a storage system is shown. System 10 includes one or more host systems designated 100A through 100N where N may be any number. Host systems 100 are coupled to a storage subsystem 150. Storage subsystem 150 includes a plurality of array controllers designated 160A-N, each of which is in turn coupled to one or more storage device arrays. The arrays are designated 170A-N. Each of the plurality of storage device arrays includes a plurality of storage devices designated 175-178 (A-N). Storage subsystem 150 also includes a redundancy controller 165. It is noted that in various embodiments, redundancy controller 165 may be implemented separately from or it may be implemented as part of each of the plurality of array controllers 160A-N.

As described above, a failure group may be defined as any group of components or storage devices that share a common SpoF. Accordingly, in the illustrated embodiment, array controller 160A, 160C and 160N are coupled to storage arrays 170A, 170C and 170N, respectively. However, array controller 160B is coupled to storage arrays 170B1 and 170B2. Thus, the storage devices in storage arrays 170A, 170C and 170N are each considered to be an independent failure group and the storage devices in storage arrays 170B1 and 170B2 are considered as one failure group.

In one embodiment, storage devices 175-178(A-N) may be any type of mass storage devices used to store system data such as hard disk drives, tape storage devices, or optical storage devices, for example. It is noted that this is merely an exemplary list of storage devices and that in other embodiments other types of storage devices are possible and contemplated.

In one embodiment, host systems 100 may be representative of any type of processing node. For example, host systems 100 may each include a processing platform including one or more processors that execute program instructions. The hosts 100 may be general computing nodes or part of specific computing application nodes such as servers, for example. In one embodiment, hosts 100 may run application software that may be stored within storage subsystem 150. In addition, the application software may use system data that is also stored within storage subsystem 150.

In one embodiment, the storage array controllers 160 control access to the storage devices in the storage arrays. In addition, storage array controllers 160 may include redundancy controller 165, which may control the configuration of the storage arrays. For example, if data protection is enabled, such as in a RAID configuration, storage array controllers 160 and therefore redundancy controller 165 may include configuration functionality which controls all aspects of RAID storage. Depending on the specific RAID protection and configuration, storage array controllers 160 may control the striping of data across the disks in a given array. In addition, storage array controllers 160 may control the striping of data in a vertical fashion such that data is striped across disks in multiple arrays. In one embodiment, during operation of storage subsystem 150 storage array controllers 160 and storage devices 175-178(A-N) may include error detection and correction hardware and software that may detect and correct certain classes of errors on-the-fly. However, if uncorrectable errors are detected from one or more storage devices, redundant system data stored in some of the storage devices may be used to reconstruct the system data.

The type and degree of protection and availability may be dictated through Service Level Agreements (SLAs), application software requirements (e.g., storage utilization), system administrators, and Quality of Service (QoS) and the like. The various requirements may be collectively referred to as system configuration parameters. In one embodiment, the configuration functionality may control the configuration and the reconfiguration of the storage volumes that may be created within storage subsystem 150 based upon the system configuration parameters.

In one embodiment, the redundancy controller may automatically implement N+K redundancy. The configuration functionality with redundancy controller may determine the number of redundant data blocks to be stored on different storage devices for a given stripe depending on the physical system configuration and particular values of N and K. More particularly, the configuration functionality may create RAID sets using an N+K configuration scheme that provides SPoF protection with an efficient number of physical storage devices given a desired level of protection, desired volume capacity and available storage device inventory in the storage subsystem 150, where N is the number of storage devices allocated to store system data and K is number of storage devices allocated to store redundant system data that will protect the data stored in the N storage devices. Further, the configuration functionality my dynamically enforce availability SLAs by automatically provisioning the storage within storage subsystem 150 without explicit system administrator interaction.

For example, a particular software application running on host 100A may require a storage volume having a certain storage capacity and a particular availability. These configuration parameters may be programmed into storage array controllers 160 such that the storage array controllers 160 may automatically (i.e., without further user intervention) configure the storage arrays 170 into the specified volume. In addition, if the system configuration parameters change due to such events as storage device failures or changing application storage requirements (e.g., storage utilization), for example, storage array controllers 160 may automatically reconfigure the storage arrays.

It is noted that in one embodiment, the configuration functionality of redundancy controller 165 may be shared and distributed across all of storage array controllers 160. However, it is contemplated that in other embodiments, the configuration functionality may be assigned to one of storage array controllers 160 with others of storage controllers 160 acting as backups. In yet other embodiments, the redundancy controller 165 may be implemented using storage subsystem hardware and software (not shown) in combination with storage array controllers 160.

As will be described in greater detail below, in one embodiment, the configuration functionality within storage array controllers 160 may use the N+K configuration scheme and system configuration parameters to configure any number of storage volumes. In one embodiment, the N+K configuration scheme may employ an N+K encoding algorithm. Such N+K encoding algorithms may use redundancy codes that use K drives worth of redundant information and can tolerate up to K device failures to enable reconstruction of data when failures occur. Additional information regarding N+K coding algorithms may be found in papers such as "An XOR based Erasure-Resilient Coding Scheme" by Blomer et al., for example Referring to FIG. 2, a flow diagram illustrating the operation of one embodiment of the storage subsystem of FIG. 1 is shown. As described above, using various configuration parameters that include initial values of N and K, such as SLAs, application software storage requirements, QoS requirements, etc., the configuration functionality of redundancy controller 165 may create a storage volume by determining which storage devices to allocate to the storage of system data N) and which storage devices to allocate to storing redundant system data (K) such as parity, for example (block 200) using an N+K scheme dependent upon the physical system configuration. It is noted that further details of the N+K scheme are described further below in conjunction with the descriptions of FIG. 3 through FIG. 7.

Figure 2:
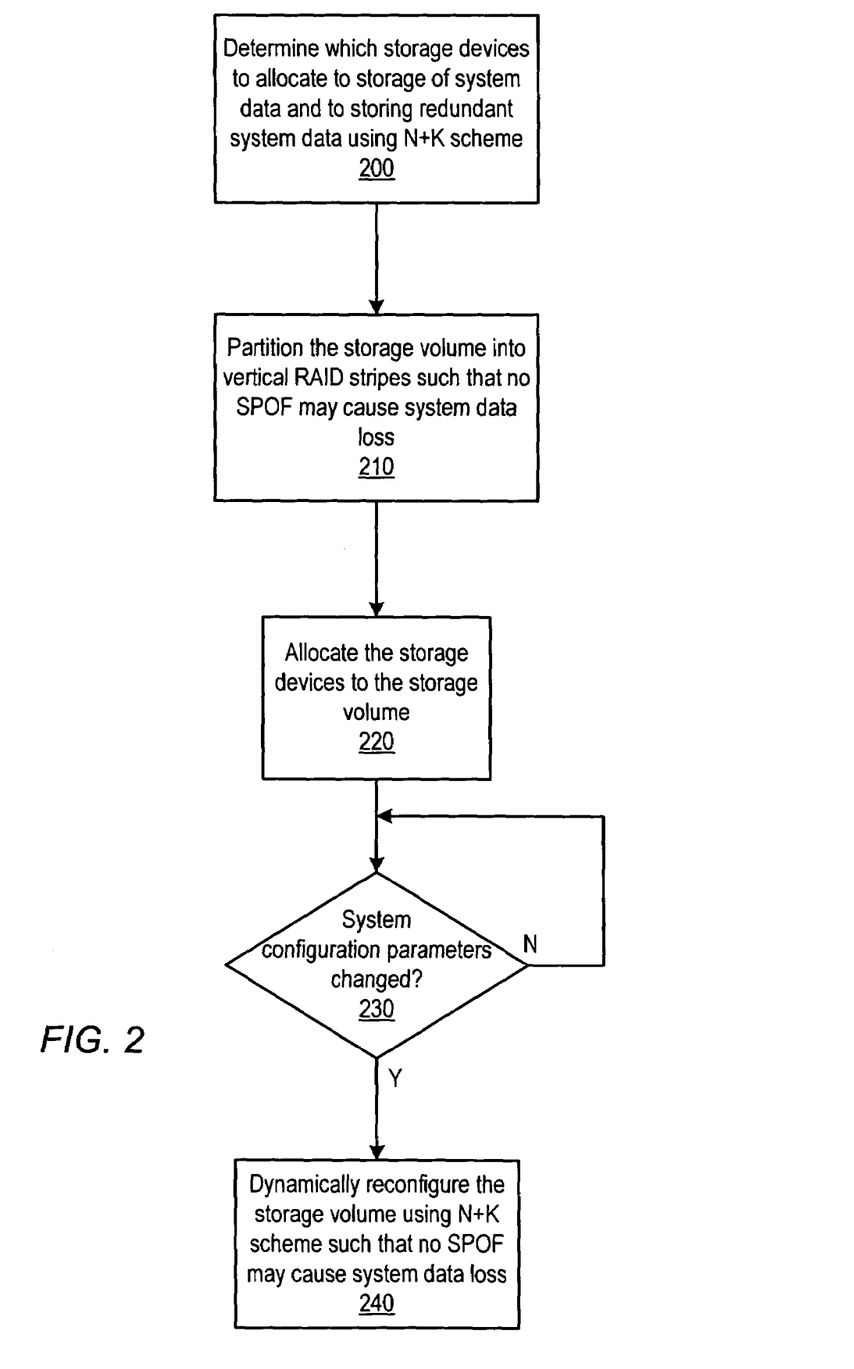
FIG. 2 is a flow diagram illustrating the operation of one embodiment of the storage subsystem of FIG. 1.

In one embodiment, the configuration functionality may partition the storage volume into vertical RAID stripes such that no single point of failure may cause a loss of system data that can't be reconstructed (block 210). The storage devices are allocated to the storage volume in their respective roles as either storing system data or redundant system data (block 220). In addition, it is contemplated that the N+K scheme may be extended such that the configuration functionality may partition the storage volume to provide protection against multiple points of failure (e.g., multiple midplane failures).

The various system configuration parameters may change during operation of storage subsystem 150. In one embodiment, the configuration functionality may monitor the configuration parameters for changes (block 230). In response to detecting a change in the system configuration parameters, such as when a storage device fails or when an SLA is modified, for example, the storage volume may be dynamically and adaptively reconfigured, without user intervention. Using the N+K configuration scheme, the configuration functionality of storage subsystem 150 may again partition the volume such that no single point of failure may cause a loss of system data that can't be reconstructed (block 240). Such a reconfiguration may take many forms depending upon the change in the configuration parameters. For example, if the reconfiguration was initiated due to a failed storage device, a spare storage device may be allocated as a system data storage device and the data that was stored in the failed device may be reconstructed and stored therein. Several configuration and reconfiguration examples are described below in conjunction with the descriptions of FIG. 4-9.

Figure 3:
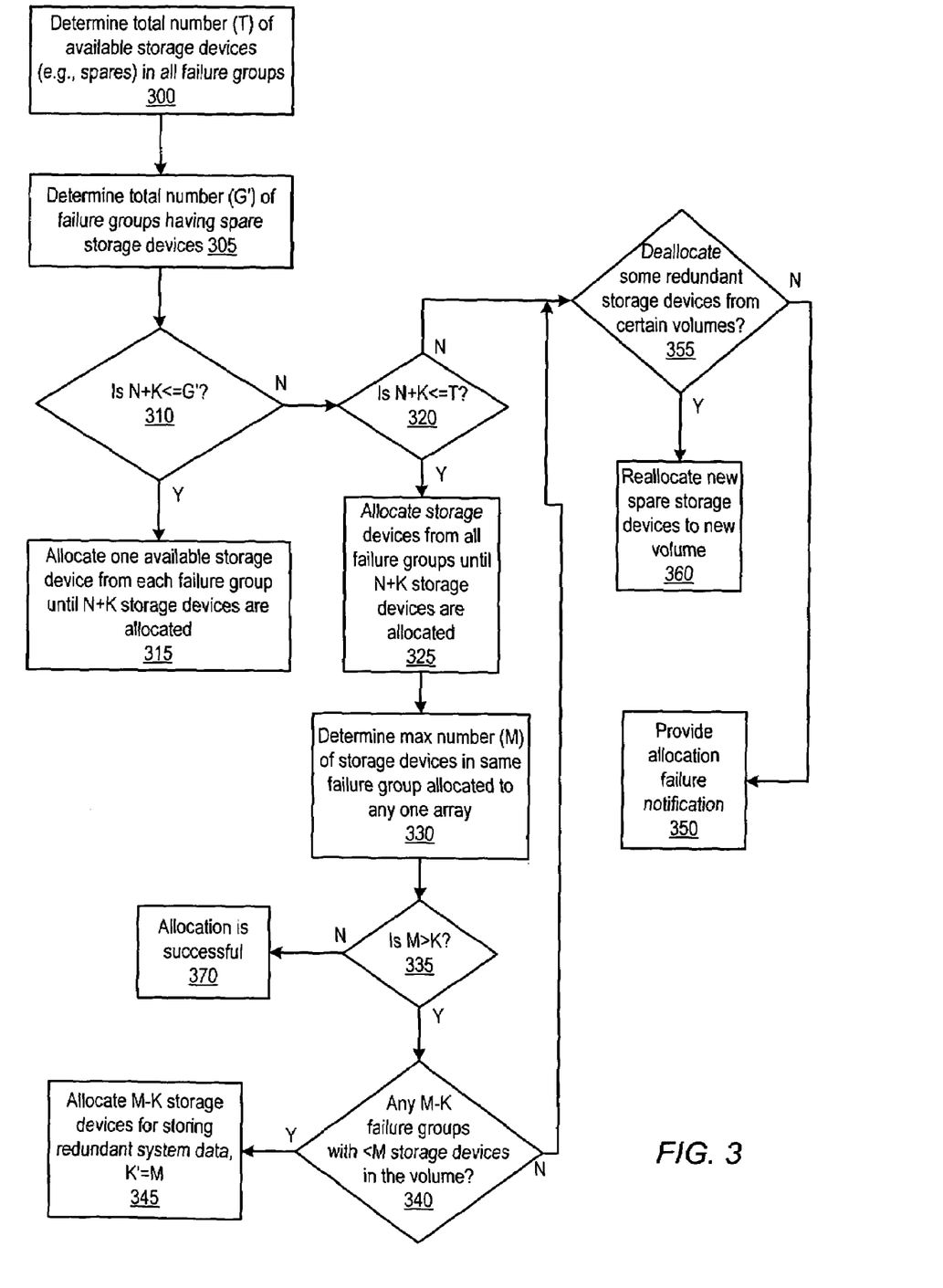
FIG. 3 is a flow diagram illustrating further details of the operation of one embodiment of the storage subsystem of FIG. 1.

Turning to FIG. 3, a flow diagram illustrating further details of the N+K scheme described above is shown. Referring collectively to FIG. 1 and FIG. 3, the configuration functionality of storage subsystem 150 may create a new volume by determining the total number (T) of available storage devices in storage system 150 (block 300) and the total number (G') of failure groups that have spare storage devices that may be allocated (where G is the total number of failure groups and $G' \leq G$ since some failure groups may no longer have any spares) (block 305). Based upon the system configuration parameters and a specified number of storage devices N+K, the configuration functionality determines if $N+K \leq G'$ (block 310). If $N+K \leq G'$ allocate one available storage device from each failure group having available storage devices until N+K storage devices have been allocated (block 315).

However, referring back to block 310, if $N+K > G'$, the configuration functionality determines if $N+K \leq T$ (block 320). If $N+K > T$, configuration functionality may determine if there are redundant storage devices allocated to storage volumes having a lower priority or that have been over-provisioned with redundant storage devices (block 355). If there are storage devices available, those storage devices may be reallocated to the storage volume being created such that $N+K \leq T$ (block 360). If there are not any redundant storage devices allocated to storage volumes having a low priority or that have been over-provisioned with redundant storage devices (block 355), an allocation failure notification may be provided (block 350). In one embodiment, in response to a failure notification, user intervention may be required.

Referring back to block 320, if $N+K \leq T$, storage devices are allocated from all failure groups until N+K storage devices have been allocated (block 325). Configuration functionality determines the maximum number of storage devices (M) in any one failure group (block 330) and determines if M>K (block 335). If $M \leq K$, the allocation is successful (block 370. However, if M>K, then the allocation is not sufficient, and the configuration functionality may determine if there are M−K failure groups that have less than M storage devices allocated to the new volume (block 340). If there are M−K arrays that have less than M storage devices allocated to the new volume, M−K additional storage devices may be allocated as redundant storage devices for the new volume. Thus, K is incremented such that K'=M (block 345). However, if there are not M−K arrays that have less than M storage devices allocated to the new volume (block 340), operation may proceed as described above in block 355, where configuration functionality may determine if there are redundant storage devices allocated to storage volumes having a low priority or that have been over-provisioned with redundant storage devices.

Figure 4:
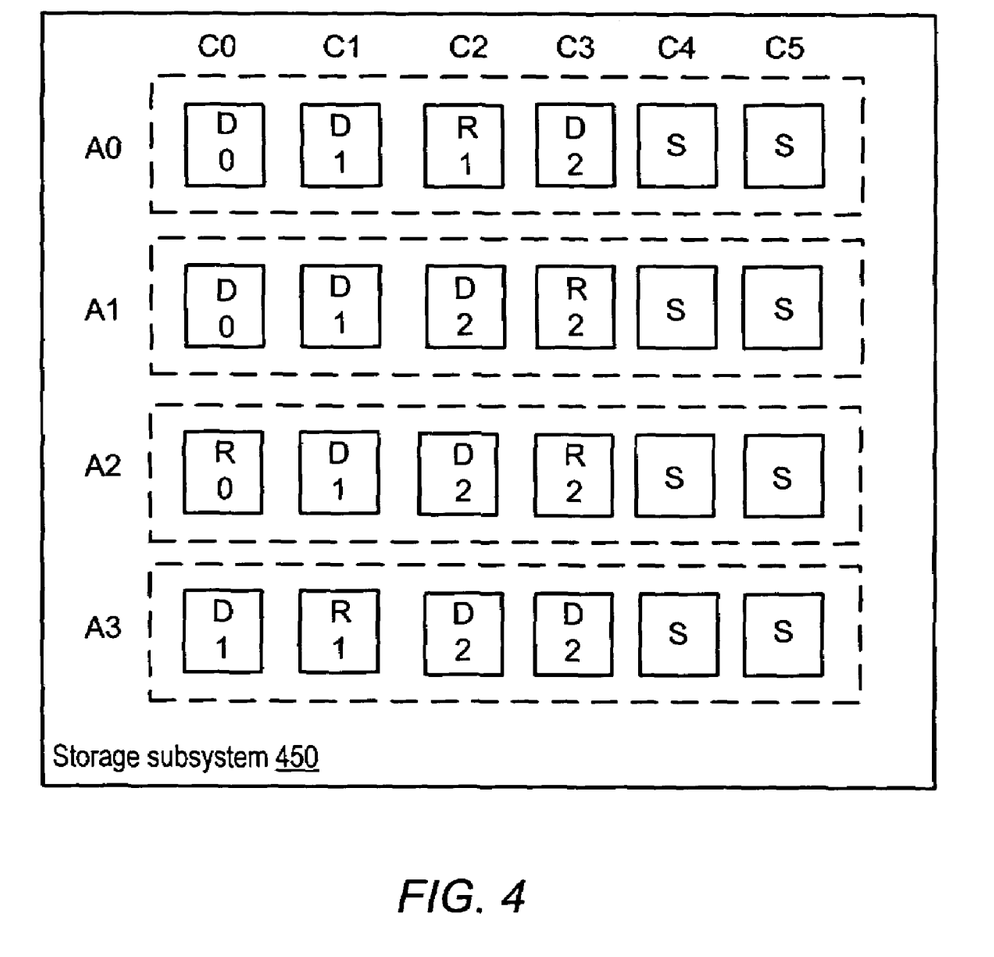
FIG. 4 is a diagram illustrating an exemplary storage array configuration according to one embodiment of an N+K scheme during creation of new volumes.

FIG. 4 illustrates an exemplary storage array configuration according to one embodiment of an N+K scheme as described above in conjunction with the descriptions of FIG. 2 and FIG. 3. Storage subsystem 450 includes four storage arrays labeled A0 through A3. Each storage array includes six storage devices which corresponds to four failure groups. For discussion purposes, each array element is represented as a column position from C0-C5. It is noted that each array may represent a storage device tray in a storage cabinet, for example. Storage devices designated with a Dn are used to store system data. Storage devices designated with a Rn are used to store redundant system data. Storage devices designated with an 'S' may be used as spares. Accordingly, from the descriptions above, with no volumes created, G'=4 and T=24. It is noted that storage subsystem 450 may be representative of a portion of storage subsystem 150 of FIG. 1.

To create a new volume with an N+K requirement of 2+1 storage devices, since N+K<G', one storage device from each array is allocated until all three storage devices have been allocated. From FIG. 4, storage devices D0 and R0 now occupy column 0 in arrays A0-A2. Thus, the new value of T becomes 21.

The next new volume has an N+K requirement of 4+1. As such, N+K>G', and N+K≦T. Thus, all storage devices are allocated from all arrays until all five storage devices have been allocated. From the diagram, storage devices D1 occupy C0 of A3 and C1 of A0-A2. The first redundant storage R1 occupies C1 of A3. However, there are two storage devices from this new volume allocated to array A3, such that M=2. Since M>K in this case (i.e., a failure of array A3 would mean a loss of data), a second redundant storage device R1 is allocated and now occupies C2 of A0. Thus, a new value of K has been created (K'=K+1=M=2), thereby adaptively creating a 4+2 RAID) set. Since six storage devices have been used, the new value of T becomes 15.

The next new volume has an N+K requirement of 5+1. As such, N+K>G', and N+K≦T. Thus, all storage devices are allocated from all arrays until all five storage device have been allocated. From the diagram, storage devices D2 occupy C2 of A1-A3 and C3 of A0 and A3. The first redundant storage R2 occupies C3 of A1. However, there are two storage devices from this new volume allocated to array A1 and A3, such that M=2. Since, M>K in this case, a second redundant storage device R2 is allocated and now occupies C3 of A2. Thus a new value of K has again been created (K'=K+1=M=2), thereby adaptively creating a 5+2 RAID set. Since seven more storage devices have been used, the new value of T becomes 8 as indicated by the spare storage devices. It is noted that the allocation of some storage devices is arbitrary. For example, the last D2 storage device may have been allocated at C3 of A1. It is noted that as shown in the diagram, it is evident from the remaining spares that if an additional new volume were desired, the maximum number of storages that may be allocated to the new volume would be six, resulting in a 6+2 RAID set.

Figure 5:
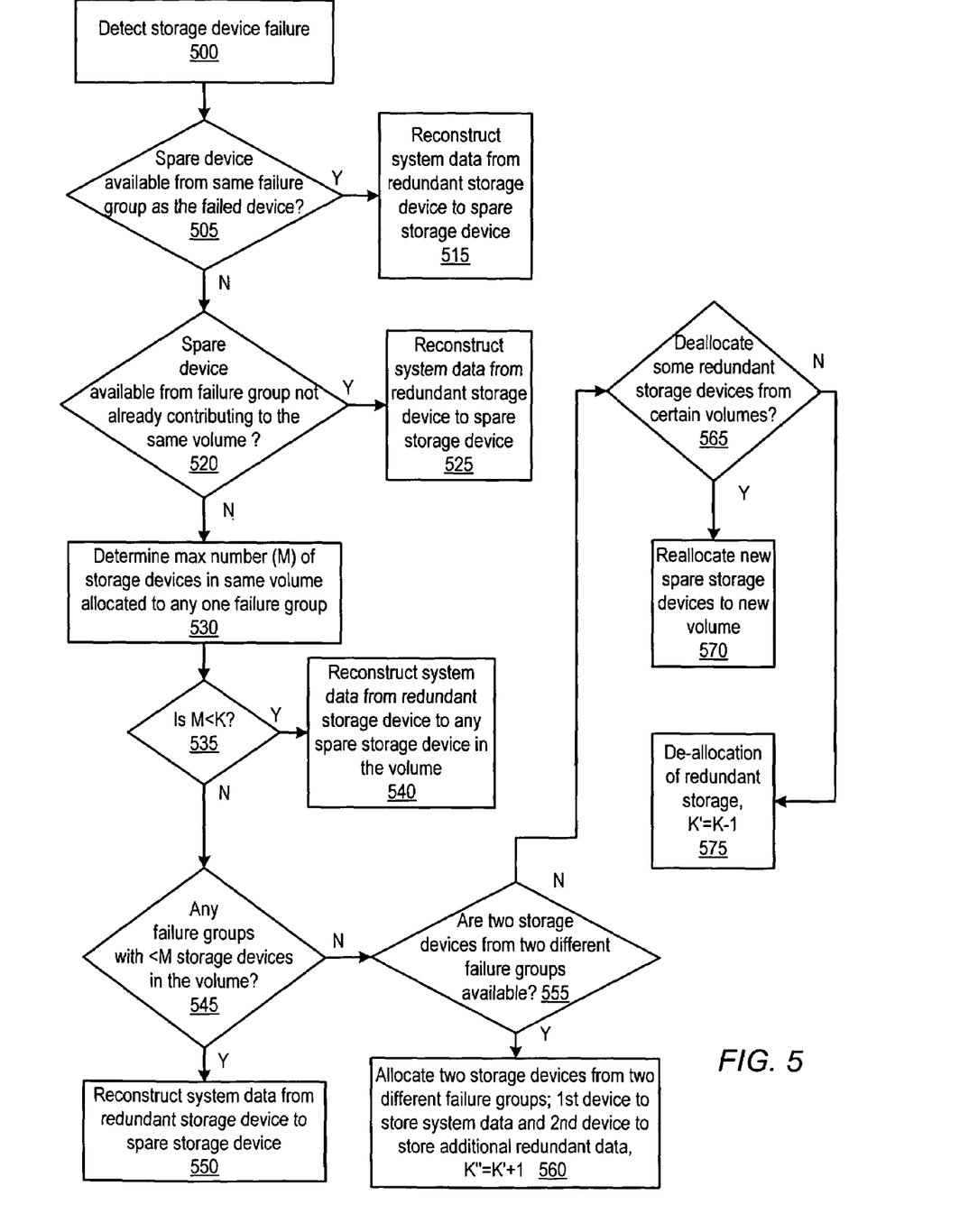
FIG. 5 is a flow diagram illustrating further details of the operation of another embodiment of the storage subsystem of FIG. 1 during storage device failures.

Turning to FIG. 5, a flow diagram illustrating further details of the operation of another embodiment of the storage subsystem of FIG. 1 during storage device failures is shown. Referring collectively to FIG. 1 and FIG. 5, failed storage devices may be reconstructed and the data stored to spare storage devices according to an N+K scheme. When a failed storage device is detected (block 500), the configuration functionality of storage subsystem 150 may determine if any spare storage devices are available from the same array or failure group as the failed device (block 505). If there are spare storage devices available from same the array or failure group, the configuration functionality may reconstruct the system data using the redundant storage device(s) to the spare storage device of same the array or failure group (block 515).

If however, there are no spare storage devices available from the same array or failure group as the failed device (block 505), configuration functionality of storage subsystem 150 may determine if any spare storage devices are available from a different array or failure group that is not already contributing storage devices to the volume of the failed storage device (block 520). If there are spare storage devices available, the configuration functionality may reconstruct the system data using the redundant storage device(s) to the spare storage device (block 525).

If there are no spare storage devices available from a different array or failure group that is not already contributing storage devices to the volume of the failed storage device (block 520), configuration functionality determines the maximum number of storage devices (M) from this volume in any one array or failure group (block 530). Configuration functionality determines if M<K (block 535). If M<K, (i.e., a spare storage device is available from an array or failure group that is not already contributing M storage devices to the volume) the configuration functionality may reconstruct the system data using the redundant storage device(s) to the spare storage device (block 540).

However, if M≧K, then the allocation is not sufficient, and the configuration functionality may determine if there is a failure group in this volume that has less than M storage devices allocated (block 545). If there is a failure group that has less than M storage devices allocated, the configuration functionality may select a spare storage from the failure group that has less than M storage devices and reconstruct the system data using the redundant storage device(s) to the spare storage device (block 550). If there no failure groups with less than M storage devices allocated, the configuration functionality may determine if there are two spare storage devices from any two different arrays or failure groups (block 555). If there are two spare storage devices available, the configuration functionality may allocate two spare storage devices from any two different arrays or failure groups. The first spare may be used to store the reconstructed system data and the second spare may be used to store additional redundant data created using the N+K scheme. A diagram illustrating an exemplary storage array reconfiguration during storage device failures according to one embodiment of an N+K scheme is shown in FIG. 6.

Referring back to block 555, if there are not two spare storage devices available from two different failure groups, the configuration functionality may determine if there are redundant storage devices allocated to storage volumes having a lower priority or that have been over-provisioned with redundant storage devices (block 565). If there are storage devices available, those storage devices may be reallocated to the higher priority storage volume with the failure (block 570). If there are not any redundant storage devices allocated to storage volumes having a lower priority or that have been over-provisioned with redundant storage devices (block 565), redundant storage devices may be de-allocated from the volume with the failure. In such cases, the value of K for the volume experiencing the failure may be decremented or reduced from its specified initial value such that K'=K−1.

Figure 6:
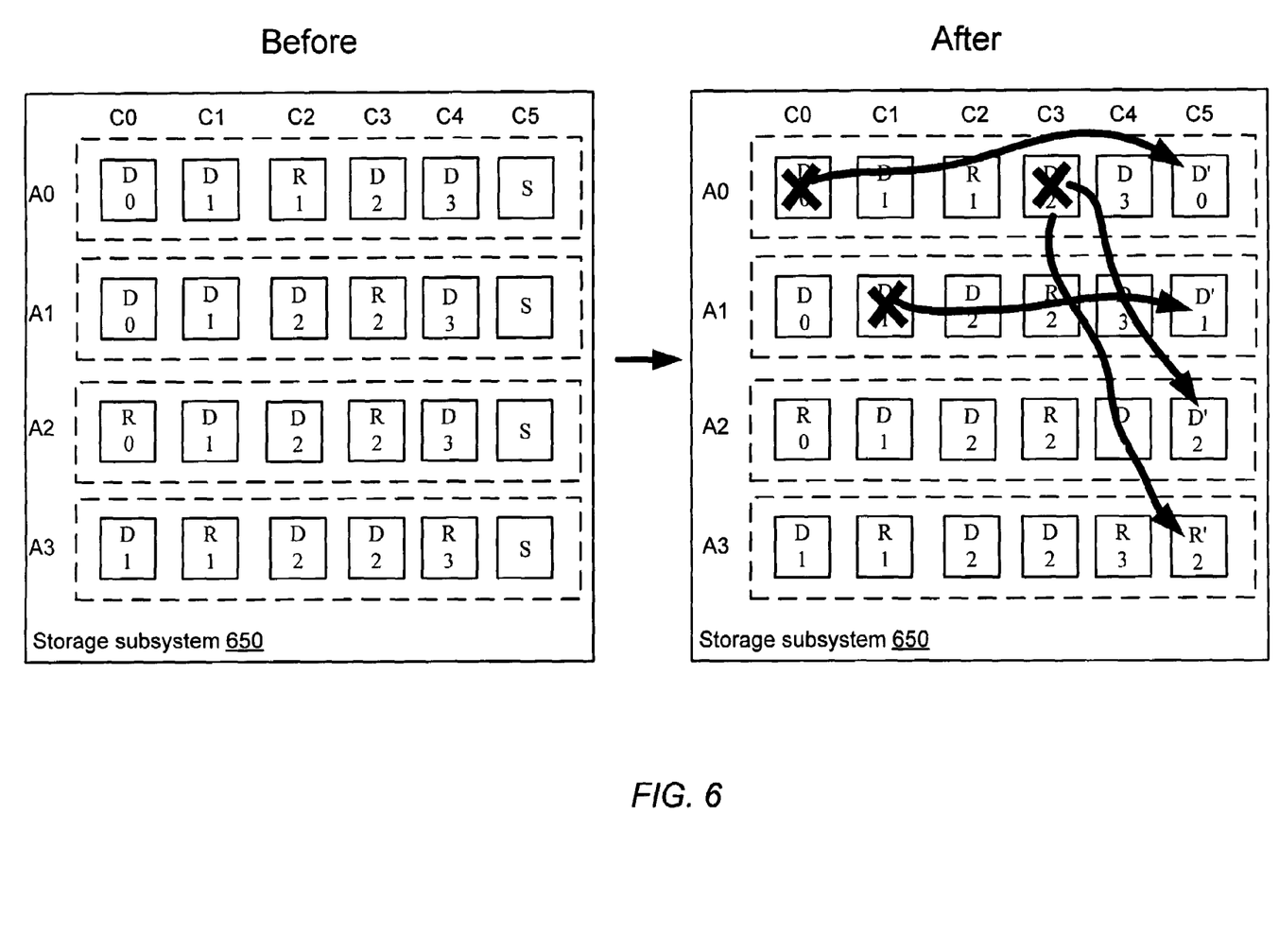
FIG. 6 is a diagram illustrating an exemplary storage array reconfiguration during storage device failures according to one embodiment of an N+K scheme.

In FIG. 6, storage system 650 includes four storage arrays labeled A0 through A3 configured into four storage volumes. Similar to storage subsystem 450 of FIG. 4, each storage array of FIG. 6 includes six storage devices. For discussion purposes, each array element is represented as a column position from C0-C5. Storage devices designated with a D0, D1, D2 and D3 are used to store system data for the four storage volumes, respectively. Storage devices designated with a R0, R1, R2, R3 are used to store redundant system data for the four storage volumes, respectively. Storage devices designated with an 'S' may be used as spares. It is noted that storage subsystem 650 may be representative of a portion of storage subsystem 150 of FIG. 1.

Beginning with the system on the left labeled "before", there is one spare storage device in each array or failure group. However, as storage devices fail, the configuration functionality described above may systematically and automatically reallocates the spare storage devices for use by the volumes experiencing storage device failures as depicted in the storage system on the right labeled "after".

In the first example, volume 0 experiences a failure of a storage device in which D0 of array A0 fails and is detected. The configuration functionality determines that there is spare storage device in the same array as the failed storage device (located at column C5 of A0). The system data from the failed storage device is reconstructed using the redundant storage device and stored on the spare, which is now labeled D0'.

In a second and similar example, volume 1 experiences a failure of a storage device in which D1 of array A1 fails and is detected. The configuration functionality determines that there is spare storage device in the same array as the failed storage device (located at column C5 of A1). The system data from the failed storage device is reconstructed using the redundant storage device and stored on the spare, which is now labeled D1'.

In a third example, volume 2 experiences a failure of a storage device in which D2 of array A0 fails and is detected. In this case, there is no spare available in the same array. Further there is no spare available in another array that is not already contributing to M=2 storage devices to volume 2. Accordingly, configuration functionality allocates two storage devices (located at column C5 of A2 and A3). In the illustrated embodiment, the storage device at C5, A2 is used to store the reconstructed system data and is now labeled D2' while the storage device at C5, A3 is used to store the additional redundant data and is now labeled R2'. However, the decision of which storage device stores the system data and the redundant data is arbitrary and either storage device may have been used to store either type of data.

The above examples illustrate how a new value of K (K') may be created by adding to an original value of K (the number of redundant storage devices protecting N system data storage devices). For example, increasing K from 1 to 2 when a 6+1. RAID configuration is changed to a 6+2 RAID configuration to match availability requirements with available resources.

It is noted that if a storage device were to fail in volume 3, since there are no longer any available storage devices, and volume 3 is assumed to be the lowest priority volume, redundant storage may be de-allocated from volume 3. Thus, a new value of K is created by reducing the value of K for volume 3 to zero from its initial value of one (K'=K−1).

Figure 7:
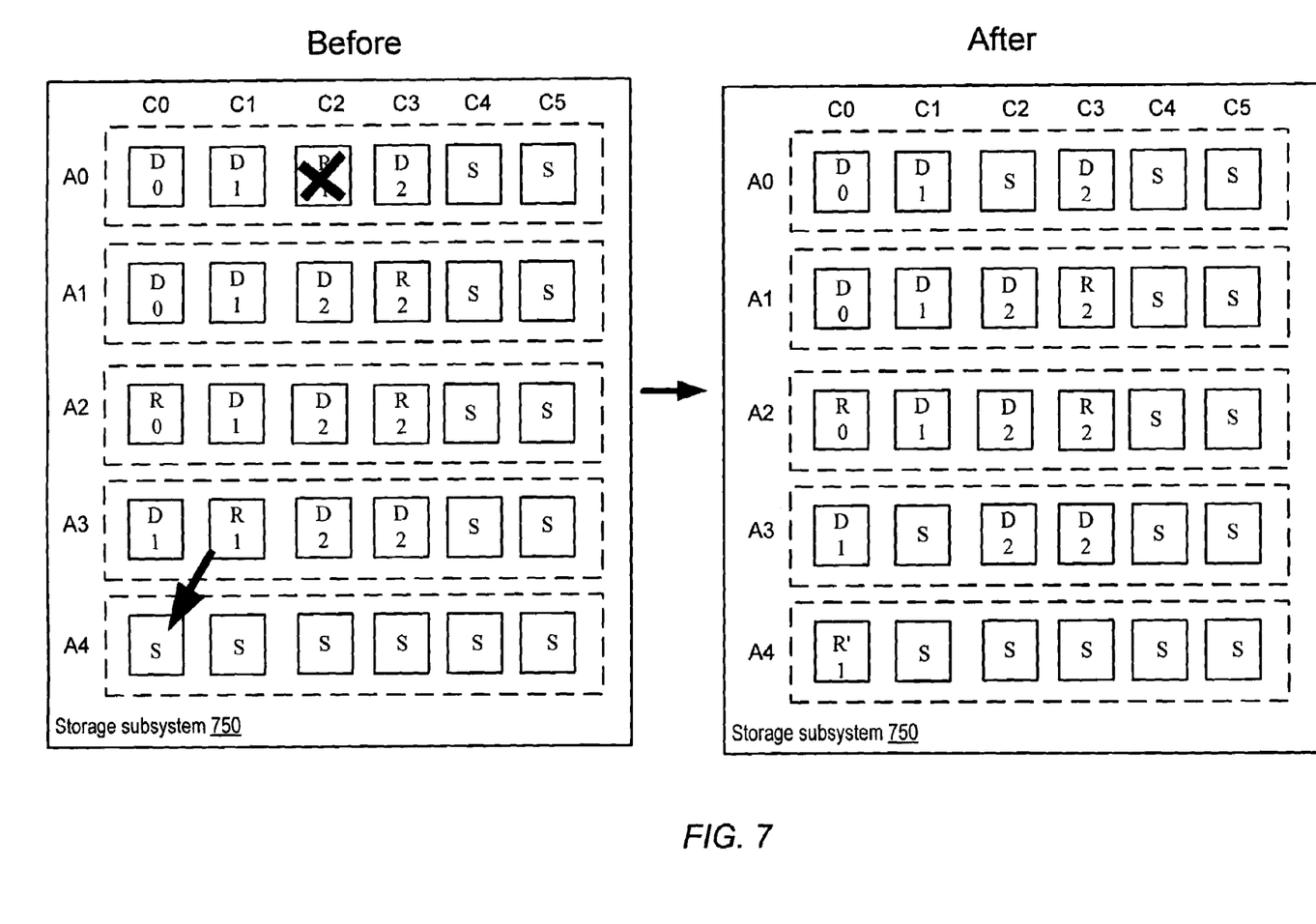
FIG. 7 is a diagram illustrating an exemplary storage array reconfiguration upon the addition of an additional storage array according to one embodiment of an N+K scheme.

In some cases, it may be possible to dynamically reduce the value of K' for a given volume for another reason. For example, if the number of storage devices is increased such as when adding a new tray (or failure group) of storage devices to an existing system, it may be possible to dynamically reduce the value of K'. In FIG. 7, a diagram illustrating an exemplary storage array reconfiguration upon the addition of an additional storage array according to one embodiment of an N+K scheme is shown.

Storage system 750 includes four storage arrays corresponding to four failure groups. The arrays are labeled A0 through A3 and configured into three storage volumes. A fifth storage array designated A4, and thus a fifth failure group, has been added. Each storage array A0-A4 includes six storage devices. As above, each array element is represented as a column position from C0-C5. Storage devices designated with a D0, D1 and D2 are used to store system data for the three storage volumes, respectively. Storage devices designated with a R0, R1 and R2 are used to store redundant system data for the three storage volumes, respectively. Storage devices designated with an 'S' may be used as spares. It is noted that storage subsystem 750 may be representative of a portion of storage subsystem 150 of FIG. 1.

Beginning with the system on the left labeled "before", a new array or failure group is added to an existing system configuration, and the configuration functionality may automatically evaluate the available resources and reallocate storage devices. For example, when the value of K has not been increased to accommodate availability requirements and available resources, then there may not be any need to reallocate storage devices. However, when a new value of K has been created such that K'=K+n, then there may be storage devices that can be deallocated from service and reallocated as spares, as depicted in the storage system on the right labeled "after".

The procedure to decrease the K' value for a volume is similar to the procedure described above for increasing the K value. The configuration functionality may determine the maximum number of storage devices (M) in each failure group in the volume. The configuration functionality determines the number of failure groups contributing M storage devices (F). If the number of new failure groups is $\geq F-1$, then it may be possible to decrease the K value for that volume.

To decrease the K' value for that volume, the configuration functionality deallocates one of the redundant storage devices in that volume. The configuration functionality moves the data stored on (F−1) storage devices from the failure groups contributing M storage devices to storage devices allocated in the new failure group. The data may be either system data or redundant system data.

In the illustrate embodiment, storage device array A4 has been added to the existing system including three volumes (or RAID sets). The configuration functionality evaluates each volume as described above. For example, since volume 0 did not have a K value that was increased, nothing is done. However, volume 1 does have an increased K value, since the original RAID set had an N+K value of 4+1, the current RAID configuration was increased to 4+2 to accommodate the availability and resources. As such, volume 1 would benefit from the added failure group. As shown in FIG. 7, the redundant storage device at C2 of A0 has been deallocated. The redundant data stored within storage device R1 (at C1 of A3) is moved to the new storage device at C0 of A4. Thus, the new value of K for volume 1 has been reduced from 2 to 1. It is noted that although volume 2 has an increased the value of K, volume 2 would not benefit from the added failure group since F=3 and the number of new failure groups is <(F−1).

It is noted that the methodologies described above for increasing and decreasing the value of K (or K') may also be used (luring system upgrade operations. For example, during a system upgrade a group of storage devices (referred to as an upgrade group) may be taken offline at the same time. These upgrade groups may be treated as failure groups by the configuration functionality. As such, the configuration functionality may dynamically ensure that the various volumes (RAID sets) of the storage subsystem are maintained with sufficient protection and availability during the removal of an upgrade group.

It is noted that there may be different parity contexts used in the storage subsystem. For example, in one embodiment, a dedicated parity context, such as in a RAID 4 system, may be used. In another embodiment, a rotated parity context, such as in a RAID 5 system, may be used. In yet another embodiment, a hybrid parity approach may be used. Dependent on the type of parity context used in the storage subsystem, the value of K may be varied differently.

In a dedicated parity context, each redundant element occupies its own storage device. Therefore, increasing the value of K includes allocating a new storage device and writing the new redundancy elements of all data stripes to the new storage device. Reducing K involves removing a storage device. The dedicated parity drive approach may be viable for systems where other methods (such as a log structured file system) ensure that the parity storage device(s) do not become a bottleneck.

Figure 8:
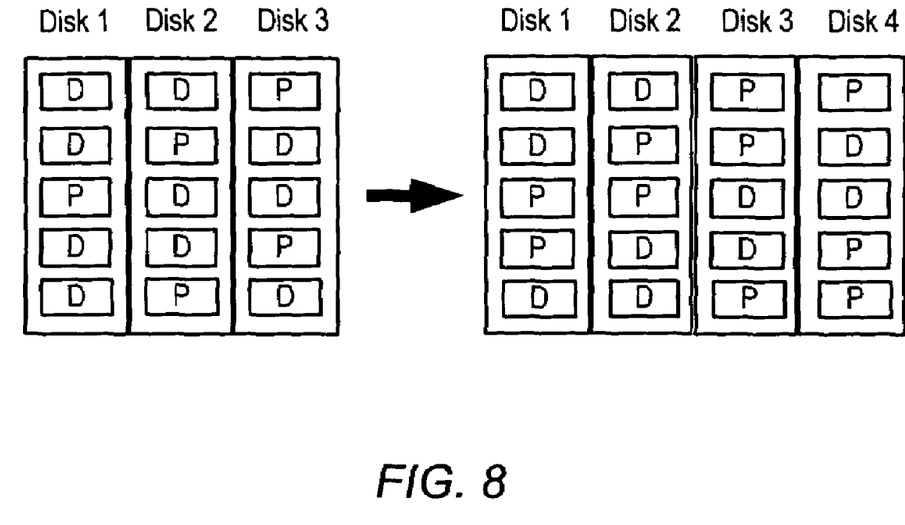
FIG. 8 is a diagram of an exemplary storage device reconfiguration according to one embodiment of an N+K scheme using a rotated parity context.

FIG. 8 illustrates how the value of K may be varied within a rotated parity context. In the illustrated embodiment, the K value is increased from 1 to 2 as a 2+1 RAID set is transformed to a 2+2 RAID set. Accordingly, the three storage disks on the left are shown with a various stripe configurations. When transforming to a 2+2 RAID set as in the system on the right, some data and parity will need to be redistributed to evenly distribute the new redundancy elements across the four storage disks. It is noted that the disk positions relative to any given array is not shown.

Figure 9:
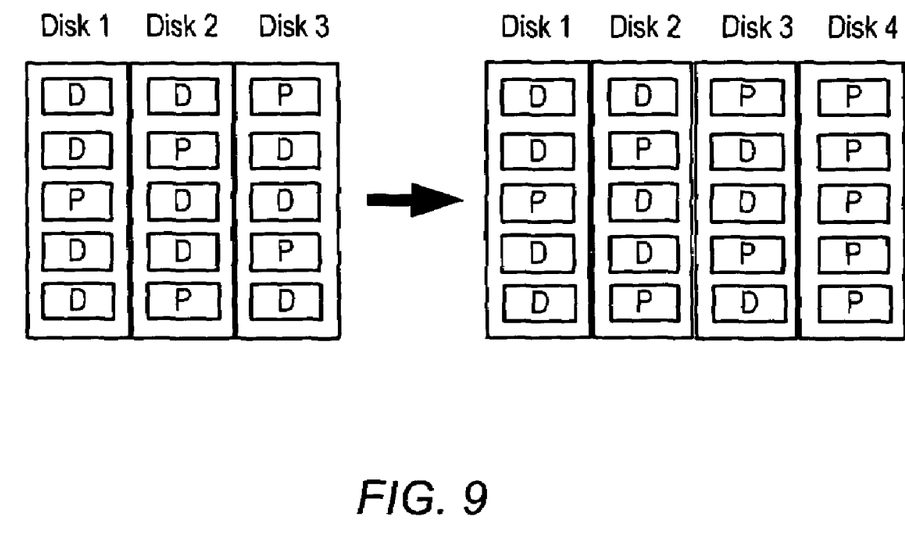
FIG. 9 is a diagram of an exemplary storage device reconfiguration according to one embodiment of an N+K scheme using a hybrid parity context.

FIG. 9 illustrates how the value of K may be varied within a hybrid parity context. In the illustrated embodiment, the K value is increased from 1 to 2 as a 2+1 RAID set is transformed to a 2+2 RAID set using the hybrid approach. Accordingly, the three storage disks on the left are shown with a various stripe configurations. When using the hybrid approach to transform to a 2+2 RAID set as in the system on the right, rotational parity is maintained for the originally specified K value and dedicated parity is maintained for the added K values. This approach may provide some convenience to dynamic K variation in the sense that as a new storage device is added, data moves may be minimized or deferred until subsequent stripe writes. However, there may be some initial performance cost. It is noted that the disk positions relative to any given array is not shown.

It is noted that although the above embodiments are described in the context of using a dedicated storage device to store redundant information, it is contemplated that in other embodiments, the redundant information corresponding to a failure group may be stored across all storage devices in that failure group.

It is further noted that while the examples described above may describe "optimal" N+K cases with exactly K storage devices of redundant info and guaranteed recovery, the approaches described above can be used with other types of coding algorithms. For example, there are classes of codes that may tolerate multiple failures. However to tolerate K failures, more than K storage device's worth of redundant information may be needed. In addition, the code enables recovery from almost K failures with high probability but recovery may not be guaranteed for all cases of K failures. These types of codes may be useful, since they enable faster computation of the redundant elements, particularly in cases where N and K are very large. Information regarding these types of N+K coding algorithms may be found in papers such as "Coding Techniques for Handling Failures in Large Disk Arrays" by Hellerstein et al. and "Practical Loss Resilient Codes" by Luby et al.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage subsystem comprising:
   a plurality of storage arrays each including a plurality of storage devices;
   a plurality of array controllers each coupled to one or more of the plurality of storage arrays and configured to create a storage volume including storage devices belonging to one or more of the plurality of storage arrays, wherein one or more arrays of the plurality of storage arrays corresponds to a failure group; and
   a redundancy controller coupled to the plurality of array controllers and configured to implement N+K redundancy, wherein the redundancy controller further includes configuration functionality configured to automatically determine a number of redundant system data blocks to be stored on different storage devices for a given stripe of data dependent upon particular values of N and K provided as system configuration parameters and dependent upon physical system configuration information;
   wherein the configuration functionality is further configured to:
      determine a total number of failure groups (G');
      determine a maximum number of storage devices (M) in any one of the storage arrays in response to determining that N+K>G'; and
      allocate M−K additional storage devices to another portion of storage devices in response to determining M>K and in response to determining there are M−K failure groups that include fewer than M storage devices allocated to the storage volume.

2. The storage subsystem as recited in claim 1, wherein the particular values of N and K are initial values provided as system configuration parameters.

3. The storage subsystem as recited in claim 2, wherein the system configuration parameters include one or more service level agreements that specify a particular storage volume availability and storage utilization.

4. The storage subsystem as recited in claim 2, wherein the system configuration parameters include a particular storage utilization associated with a software application.

5. The storage subsystem as recited in claim 1, wherein in response to detecting a change in the physical system configuration information, the configuration functionality is further configured to dynamically and automatically reconfigure the storage volume and to determine the number of redundant system data blocks to be stored on different storage devices for a given stripe of data.

6. The storage subsystem as recited in claim 5, wherein the physical system configuration information includes a total number of the storage devices and a total number of failure groups.

7. The storage subsystem as recited in claim 1, wherein a failure of a storage device is a change in the physical system configuration information.

8. The storage subsystem as recited in claim 1, wherein the configuration functionality is further configured to encode redundant system data blocks with an N+K redundancy code for reconstructing the system data.

9. The storage subsystem as recited in claim 1, wherein the configuration functionality is further configured to:
   determine the total number of available storage devices in all of the failure groups (T);

allocate one available storage device from each of the failure groups until N+K storage devices are allocated in response to determining that N+K≦G'; and allocate from all of the failure groups until N+K storage devices are allocated in response to determining that N+K>G' and N+K≦T.

10. The storage subsystem as recited in claim 1, wherein the configuration functionality is further configured to provide a failure notification in response to determining there are no M−K failure groups that include fewer than M storage devices allocated to the storage volume.

11. The storage subsystem as recited in claim 1, wherein in response to detecting a change in the system configuration parameters, the configuration functionality is further configured to dynamically and automatically reconfigure the storage volume and to determine a new number of redundant system data blocks to be stored on different storage devices for a given stripe of data.

12. The storage subsystem as recited in claim 10, wherein the configuration functionality is further configured to reallocate one or more storage devices belonging to existing storage volumes as spare storage devices by reducing a number of storage devices allocated as redundant storage devices in the existing volumes in response to determining that N+K>G' and N+K>T.

13. A method for dynamic configuration of a storage subsystem including a plurality of storage arrays each including a plurality of storage devices, said method comprising:

creating a storage volume including storage devices belonging to one or more of plurality of storage arrays, wherein one or more arrays of the plurality of storage arrays corresponds to a failure group;

implementing N+K redundancy, by automatically determining a number of redundant system data blocks to be stored on different storage devices for a given stripe of data dependent upon particular values of N and K provided as system configuration parameters and dependent upon physical system configuration information;

determining a total number of failure groups (G');

determining a maximum number of storage devices (M) in any one of the storage arrays in response to determining that N+K>G'; and allocating M−K additional storage devices to another portion of storage devices in response to determining M>K and in response to determining there are M−K failure groups that include fewer than M storage devices allocated to the storage volume.

14. The method as recited in claim 13, wherein the system configuration parameters include one or more service level agreements that specify a particular storage volume availability and storage utilization using the particular values of N and K as initial values.

15. The method as recited in claim 13 further comprising dynamically reconfiguring the storage volume and determining the number of redundant system data blocks to be stored on different storage devices for a given stripe of data in response to detecting a change in the physical system configuration information.

16. The method as recited in claim 15, wherein the physical system configuration information includes a total number of the storage devices and a total number of the failure groups.

17. The method as recited in claim 13 further comprising:

in response to detecting a failure associated with a storage device in the storage volume, allocating a spare storage device belonging to a same failure groups as the failing storage device and reconstructing the system data to the allocated storage device; and allocating a spare storage device from another failure groups that does not include a storage device belonging to the storage volume in response to determining there are no spare storage devices available in the same failure groups as the failing storage device.

18. The method as recited in claim 13, further comprising dynamically and automatically reconfiguring the storage volume and determining a new number of redundant system data blocks to be stored on different storage devices for a given stripe of data in response to detecting a change in system configuration parameters.

19. A storage subsystem comprising:

a plurality of storage arrays each including a plurality of storage devices;

a plurality of array controllers each coupled to one or more of the plurality of storage arrays and configured to create a storage volume including storage devices belonging to one or more of the plurality of storage arrays, wherein one or more arrays of the plurality of storage arrays corresponds to a failure group; and a redundancy controller coupled to the plurality of array controllers and configured to implement N+K redundancy, wherein the redundancy controller further includes configuration functionality configured to automatically determine a number of redundant system data blocks to be stored on different storage devices for a given stripe of data dependent upon particular values of N and K provided as system configuration parameters and dependent upon physical system configuration information;

wherein the configuration functionality is further configured to:

in response to detecting a failure associated with a storage device in the storage volume, allocate a spare storage device belonging to a same failure group as the failing storage device and reconstruct the system data to the allocated storage device;

allocate a spare storage device from another failure group that does not include a storage device belonging to the storage volume in response to determining there are no spare storage devices available in the same failure groups as the failing storage device;

determine a maximum number of storage devices (M) in any of the failure groups and allocate a spare storage device belonging to a storage array that is not already contributing M storage devices in response to determining there are no spare storage devices from another failure group that does not include a storage device belonging to the storage volume; and allocate two storage devices from two different failure groups, using the first of the two storage devices to reconstruct the contents of the failed storage device and using the second of the two storage devices to create a new redundant storage device in response to determining there are no spare storage devices belonging to a failure group that is not already contributing M storage devices.

* * * * *